US011555900B1

(12) United States Patent
Barak et al.

(10) Patent No.: US 11,555,900 B1
(45) Date of Patent: Jan. 17, 2023

(54) LIDAR SYSTEM WITH ENHANCED AREA COVERAGE (71) Applicant: APPLE INC., Cupertino, CA (US)

(72) Inventors: Oz Barak, Tel Aviv (IL); James J. Reuther, San Francisco, CA (US); Malcolm J. Northcott, Santa Cruz, CA (US); Nadav Fine, Herzliya (IL)

(73) Assignee: APPLE INC., Cupertino, CA (US)

( * ) Notice: Subject to any disclaimer, the term of this patent is extended or adjusted under 35 U.S.C. 154(b) by 519 days.

(21) Appl. No.: 16/679,360

(22) Filed: Nov. 11, 2019

Related U.S. Application Data (60) Provisional application No. 62/875,005, filed on Jul. 17, 2019.

(51) Int. Cl.
G01S 7/4865 (2020.01)
G01S 7/48 (2006.01)
G01S 17/89 (2020.01)
G01S 7/484 (2006.01)
G01S 7/487 (2006.01)
G01S 7/4863 (2020.01)

(52) U.S. Cl.
CPC .......... G01S 7/4865 (2013.01); G01S 7/4802 (2013.01); G01S 7/484 (2013.01); G01S 7/487 (2013.01); G01S 7/4863 (2013.01); G01S 17/89 (2013.01)

(58) Field of Classification Search
CPC .... G01S 7/4865; G01S 7/4863; G01S 7/4965; G01S 7/4802
See application file for complete search history.

(56) References Cited

U.S. PATENT DOCUMENTS 4,623,237 A 11/1986 Kaneda et al.
4,757,200 A 7/1988 Shepherd
5,164,823 A 11/1992 Keeler
(Continued)

FOREIGN PATENT DOCUMENTS

CA 2605339 C 10/1994
CN 103763485 A 4/2014
(Continued)

OTHER PUBLICATIONS

IN Application # 202117029897 Office Action dated Mar. 10, 2022.
(Continued)

Primary Examiner — Bryan Bui
(74) Attorney, Agent, or Firm — Kligler & Associates Patent Attorneys Ltd (57) ABSTRACT Depth-sensing apparatus includes a laser, which emits pulses of optical radiation toward a scene. One or more detectors receive the optical radiation that is reflected from points in the scene and to output signals indicative of respective times of arrival of the received radiation. A scanner scans the pulses of optical radiation across the scene along successive parallel scan lines of a raster. Control and processing circuitry drives the laser to emit a succession of output sequences of the pulses with different, respective temporal spacings between the pulses within the output sequences in the succession, and matches the times of arrival of the signals due to the optical radiation reflected from the points in at least two adjacent scan lines in the raster to the temporal spacings of the output sequences in order to find respective times of flight for the points in the scene.

20 Claims, 6 Drawing Sheets

(56) References Cited

U.S. PATENT DOCUMENTS

| | | | |
|---|---|---|---|
| 5,270,780 | A | 12/1993 | Moran et al. |
| 5,373,148 | A * | 12/1994 | Dvorkis ............ G06K 7/10693 |
| | | | 235/462.43 |
| 5,699,149 | A | 12/1997 | Kuroda et al. |
| 6,301,003 | B1 | 10/2001 | Shirai et al. |
| 6,384,903 | B1 | 5/2002 | Fuller |
| 6,710,859 | B2 | 3/2004 | Shirai et al. |
| 7,126,218 | B1 | 10/2006 | Darveaux et al. |
| 7,193,690 | B2 | 3/2007 | Ossig et al. |
| 7,303,005 | B2 | 12/2007 | Reis et al. |
| 7,405,812 | B1 | 7/2008 | Bamji |
| 7,508,496 | B2 | 3/2009 | Mettenleiter et al. |
| 7,800,067 | B1 | 9/2010 | Rajavel et al. |
| 7,800,739 | B2 | 9/2010 | Rohner et al. |
| 7,812,301 | B2 | 10/2010 | Oike et al. |
| 7,969,558 | B2 | 6/2011 | Hall |
| 8,193,482 | B2 | 6/2012 | Itsler |
| 8,259,293 | B2 | 9/2012 | Andreou |
| 8,275,270 | B2 | 9/2012 | Shushakov et al. |
| 8,355,117 | B2 | 1/2013 | Niclass |
| 8,405,020 | B2 | 3/2013 | Menge |
| 8,675,181 | B2 | 3/2014 | Hall |
| 8,736,818 | B2 | 5/2014 | Weimer et al. |
| 8,766,164 | B2 | 7/2014 | Sanfilippo et al. |
| 8,766,808 | B2 | 7/2014 | Hogasten |
| 8,891,068 | B2 | 11/2014 | Eisele et al. |
| 8,925,814 | B1 | 1/2015 | Schneider et al. |
| 8,963,069 | B2 | 2/2015 | Drader et al. |
| 9,002,511 | B1 | 4/2015 | Hickerson et al. |
| 9,024,246 | B2 | 5/2015 | Jiang et al. |
| 9,052,356 | B2 | 6/2015 | Chu et al. |
| 9,076,707 | B2 | 7/2015 | Harmon |
| 9,016,849 | B2 | 8/2015 | Duggal et al. |
| 9,335,220 | B2 | 5/2016 | Shpunt et al. |
| 9,354,332 | B2 | 5/2016 | Zwaans et al. |
| 9,465,111 | B2 | 10/2016 | Wilks et al. |
| 9,516,248 | B2 | 12/2016 | Cohen et al. |
| 9,709,678 | B2 | 7/2017 | Matsuura |
| 9,736,459 | B2 | 8/2017 | Mor et al. |
| 9,739,881 | B1 | 8/2017 | Pavek et al. |
| 9,761,049 | B2 | 9/2017 | Naegle et al. |
| 9,786,701 | B2 | 10/2017 | Mellot et al. |
| 9,810,777 | B2 | 11/2017 | Williams et al. |
| 9,874,635 | B1 | 1/2018 | Eichenholz et al. |
| 10,063,844 | B2 | 8/2018 | Adam et al. |
| 10,067,224 | B2 | 9/2018 | Moore et al. |
| 10,132,616 | B2 | 11/2018 | Wang |
| 10,215,857 | B2 | 2/2019 | Oggier et al. |
| 10,269,104 | B2 | 4/2019 | Hannuksela et al. |
| 10,386,487 | B1 | 8/2019 | Wilton et al. |
| 10,424,683 | B1 | 9/2019 | Do Valle et al. |
| 10,613,203 | B1 | 4/2020 | Rekow et al. |
| 10,782,393 | B2 | 9/2020 | Dussan et al. |
| 2001/0020673 | A1 | 9/2001 | Zappa et al. |
| 2002/0071126 | A1 | 6/2002 | Shirai et al. |
| 2002/0131035 | A1 | 9/2002 | Watanabe et al. |
| 2002/0154054 | A1 | 10/2002 | Small |
| 2002/0186362 | A1 | 12/2002 | Shirai et al. |
| 2004/0051859 | A1 | 3/2004 | Flockencier |
| 2004/0135992 | A1 | 7/2004 | Munro |
| 2004/0212863 | A1* | 10/2004 | Schanz ................ G02B 26/108 |
| | | | 359/211.2 |
| 2006/0044546 | A1 | 3/2006 | Lewin et al. |
| 2006/0106317 | A1 | 5/2006 | McConnell et al. |
| 2007/0145136 | A1 | 6/2007 | Wiklof et al. |
| 2009/0009747 | A1 | 1/2009 | Wolf et al. |
| 2009/0262760 | A1 | 10/2009 | Krupkin et al. |
| 2009/0273770 | A1 | 11/2009 | Bauhahn et al. |
| 2009/0275841 | A1 | 11/2009 | Melendez et al. |
| 2010/0019128 | A1 | 1/2010 | Itzler |
| 2010/0045965 | A1 | 2/2010 | Meneely |
| 2010/0096459 | A1 | 4/2010 | Gurevich |
| 2010/0121577 | A1 | 5/2010 | Zhang et al. |
| 2010/0250189 | A1 | 9/2010 | Brown |
| 2010/0286516 | A1 | 11/2010 | Fan et al. |
| 2011/0006190 | A1 | 1/2011 | Alameh et al. |
| 2011/0128524 | A1 | 6/2011 | Vert et al. |
| 2011/0181864 | A1 | 7/2011 | Schmitt et al. |
| 2012/0038904 | A1 | 2/2012 | Fossum et al. |
| 2012/0075615 | A1 | 3/2012 | Niclass et al. |
| 2012/0132636 | A1 | 5/2012 | Moore |
| 2012/0153120 | A1 | 6/2012 | Baxter |
| 2012/0154542 | A1 | 6/2012 | Katz et al. |
| 2012/0176476 | A1 | 7/2012 | Schmidt et al. |
| 2012/0249998 | A1 | 10/2012 | Eisele et al. |
| 2012/0287242 | A1 | 11/2012 | Gilboa et al. |
| 2012/0294422 | A1 | 11/2012 | Cheung et al. |
| 2013/0015331 | A1 | 1/2013 | Birk et al. |
| 2013/0079639 | A1 | 3/2013 | Hoctor et al. |
| 2013/0092846 | A1 | 4/2013 | Henning et al. |
| 2013/0107016 | A1 | 5/2013 | Federspiel |
| 2013/0208258 | A1 | 8/2013 | Eisele et al. |
| 2013/0236171 | A1 | 9/2013 | Saunders |
| 2013/0258099 | A1 | 10/2013 | Ovsiannikov et al. |
| 2013/0278917 | A1 | 10/2013 | Korekado et al. |
| 2013/0300838 | A1 | 11/2013 | Borowski |
| 2013/0342835 | A1 | 12/2013 | Blacksberg |
| 2014/0027606 | A1 | 1/2014 | Raynor et al. |
| 2014/0077086 | A1 | 3/2014 | Batkilin et al. |
| 2014/0078491 | A1 | 3/2014 | Eisele et al. |
| 2014/0162714 | A1 | 6/2014 | Kim et al. |
| 2014/0191115 | A1 | 7/2014 | Webster et al. |
| 2014/0198198 | A1 | 7/2014 | Geissbuehler et al. |
| 2014/0231630 | A1 | 8/2014 | Rae et al. |
| 2014/0240317 | A1 | 8/2014 | Go et al. |
| 2014/0240691 | A1 | 8/2014 | Mheen et al. |
| 2014/0268127 | A1 | 9/2014 | Day |
| 2014/0300907 | A1 | 10/2014 | Kimmel |
| 2014/0321862 | A1 | 10/2014 | Frohlich et al. |
| 2014/0353471 | A1 | 12/2014 | Raynor et al. |
| 2015/0041625 | A1 | 2/2015 | Dutton et al. |
| 2015/0062558 | A1 | 3/2015 | Koppal et al. |
| 2015/0131080 | A1 | 5/2015 | Retterath et al. |
| 2015/0163429 | A1 | 6/2015 | Dai et al. |
| 2015/0192676 | A1 | 7/2015 | Kotelnikov et al. |
| 2015/0200222 | A1 | 7/2015 | Webster |
| 2015/0200314 | A1 | 7/2015 | Webster |
| 2015/0260830 | A1 | 9/2015 | Ghosh et al. |
| 2015/0285625 | A1 | 10/2015 | Deane et al. |
| 2015/0362585 | A1 | 12/2015 | Ghosh et al. |
| 2015/0373322 | A1 | 12/2015 | Goma et al. |
| 2016/0003944 | A1 | 1/2016 | Schmidtke et al. |
| 2016/0041266 | A1 | 2/2016 | Smits |
| 2016/0072258 | A1 | 3/2016 | Seurin et al. |
| 2016/0080709 | A1 | 3/2016 | Viswanathan et al. |
| 2016/0259038 | A1 | 9/2016 | Retterath et al. |
| 2016/0259057 | A1 | 9/2016 | Ito |
| 2016/0274222 | A1 | 9/2016 | Yeun |
| 2016/0334508 | A1 | 11/2016 | Hall et al. |
| 2016/0344965 | A1 | 11/2016 | Grauer |
| 2017/0006278 | A1 | 1/2017 | Vandame et al. |
| 2017/0038459 | A1 | 2/2017 | Kubacki et al. |
| 2017/0052065 | A1 | 2/2017 | Sharma et al. |
| 2017/0067734 | A1 | 3/2017 | Heidemann et al. |
| 2017/0131388 | A1 | 5/2017 | Campbell et al. |
| 2017/0131718 | A1 | 5/2017 | Matsumura et al. |
| 2017/0139041 | A1 | 5/2017 | Drader et al. |
| 2017/0176577 | A1 | 6/2017 | Halliday |
| 2017/0176579 | A1 | 6/2017 | Niclass et al. |
| 2017/0179173 | A1 | 6/2017 | Mandai et al. |
| 2017/0184450 | A1 | 6/2017 | Doylend et al. |
| 2017/0184704 | A1 | 6/2017 | Yang et al. |
| 2017/0184709 | A1 | 6/2017 | Kenzler et al. |
| 2017/0188016 | A1 | 6/2017 | Hudman |
| 2017/0219695 | A1 | 8/2017 | Hall et al. |
| 2017/0242102 | A1 | 8/2017 | Dussan et al. |
| 2017/0242108 | A1 | 8/2017 | Dussan et al. |
| 2017/0257617 | A1 | 9/2017 | Retterath |
| 2017/0269209 | A1 | 9/2017 | Hall et al. |
| 2017/0303789 | A1 | 10/2017 | Tichauer et al. |
| 2017/0329010 | A1 | 11/2017 | Warke et al. |
| 2017/0343675 | A1 | 11/2017 | Oggier et al. |
| 2017/0356796 | A1 | 12/2017 | Nishio |
| 2017/0356981 | A1 | 12/2017 | Yang et al. |

(56) References Cited

U.S. PATENT DOCUMENTS

| | | |
|---|---|---|
| 2018/0045816 A1 | 2/2018 | Jarosinski et al. |
| 2018/0059220 A1 | 3/2018 | Irish et al. |
| 2018/0062345 A1 | 3/2018 | Bills et al. |
| 2018/0081032 A1 | 3/2018 | Torruellas et al. |
| 2018/0081041 A1 | 3/2018 | Niclass et al. |
| 2018/0115762 A1 | 4/2018 | Bulteel et al. |
| 2018/0131449 A1 | 5/2018 | Kare et al. |
| 2018/0167602 A1 | 6/2018 | Pacala et al. |
| 2018/0203247 A1 | 7/2018 | Chen et al. |
| 2018/0205943 A1 | 7/2018 | Trail |
| 2018/0209846 A1 | 7/2018 | Mandai et al. |
| 2018/0259645 A1 | 9/2018 | Shu et al. |
| 2018/0299554 A1 | 10/2018 | Van Dyck et al. |
| 2018/0341009 A1 | 11/2018 | Niclass et al. |
| 2019/0004156 A1 | 1/2019 | Niclass et al. |
| 2019/0011556 A1 | 1/2019 | Pacala et al. |
| 2019/0011567 A1 | 1/2019 | Pacala et al. |
| 2019/0018117 A1 | 1/2019 | Perenzoni et al. |
| 2019/0018118 A1 | 1/2019 | Perenzoni et al. |
| 2019/0018119 A1 | 1/2019 | Laifenfeld et al. |
| 2019/0018143 A1 | 1/2019 | Thayer et al. |
| 2019/0037120 A1 | 1/2019 | Ohki |
| 2019/0056497 A1 | 2/2019 | Pacala et al. |
| 2019/0094364 A1 | 3/2019 | Fine et al. |
| 2019/0170855 A1 | 6/2019 | Keller et al. |
| 2019/0178995 A1 | 6/2019 | Tsai et al. |
| 2019/0257950 A1 | 8/2019 | Patanwala et al. |
| 2019/0277952 A1 | 9/2019 | Beuschel et al. |
| 2019/0361404 A1 | 11/2019 | Mautner et al. |
| 2020/0142033 A1 | 5/2020 | Shand |
| 2020/0233068 A1 | 7/2020 | Henderson et al. |
| 2020/0314294 A1 | 10/2020 | Schoenlieb et al. |

FOREIGN PATENT DOCUMENTS

| | | |
|---|---|---|
| CN | 104730535 A | 6/2015 |
| CN | 104914446 A | 9/2015 |
| CN | 105992960 A | 10/2016 |
| CN | 106405572 A | 2/2017 |
| CN | 110609293 A | 12/2019 |
| DE | 202013101039 U1 | 3/2014 |
| EP | 2157445 A2 | 2/2010 |
| EP | 2322953 A1 | 5/2011 |
| EP | 2469297 A1 | 6/2012 |
| EP | 2477043 A1 | 7/2012 |
| EP | 2827175 A2 | 1/2015 |
| EP | 3285087 A1 | 2/2018 |
| EP | 3318895 A1 | 5/2018 |
| EP | 3521856 A1 | 8/2019 |
| JP | H02287113 A | 11/1990 |
| JP | H0567195 A | 3/1993 |
| JP | 09197045 A | 7/1997 |
| JP | H10170637 A | 6/1998 |
| JP | H11063920 A | 3/1999 |
| JP | 2011089874 A | 5/2011 |
| JP | 2011237215 A | 11/2011 |
| JP | 2013113669 A | 6/2013 |
| JP | 2014059301 A | 4/2014 |
| KR | 101318951 B1 | 10/2013 |
| WO | 9008946 A1 | 8/1990 |
| WO | 2010149593 A1 | 12/2010 |
| WO | 2013028691 A1 | 2/2013 |
| WO | 2015199615 A1 | 12/2015 |
| WO | 2017106875 A1 | 6/2017 |
| WO | 2018122560 A1 | 7/2018 |
| WO | 2020101576 A1 | 5/2020 |
| WO | 2020109378 A1 | 6/2020 |
| WO | 2020201452 A1 | 10/2020 |

OTHER PUBLICATIONS

IN Application # 202117028974 Office Action dated Mar. 2, 2022.
U.S. Appl. No. 16/532,517 Office Action dated Oct. 14, 2020.
EP Application # 20177707.5 Search Report dated Nov. 12, 2020.
JP Application # 2020001203 Office Action dated Feb. 4, 2021.
U.S. Appl. No. 16/752,653 Office Action dated Feb. 4, 2021.
CN Application # 201680074428.8 Office Action dated Jun. 23, 2021.
Zhu Jian, "Research of Simulation of Super-Resolution Reconstruction of Infrared Image", abstract page, Master's Thesis, p. 1, Nov. 15, 2005.
U.S. Appl. No. 15/844,665 office action dated Jun. 1, 2020.
U.S. Appl. No. 15/950,186 office action dated Jun. 23, 2020.
U.S. Appl. No. 15/586,286 office action dated Dec. 2, 2019.
International Application # PCT/US2019/45187 search report dated Nov. 15, 2019.
Oggier et al., U.S. Appl. No. 16/532,513, filed Aug. 6, 2019.
International Application # PCT/US2020/058760 Search Report dated Feb. 9, 2021.
TW Application # 109119267 Office Action dated Mar. 10, 2021.
U.S. Appl. No. 16/752,653 Office Action dated Apr. 5, 2021.
U.S. Appl. No. 15/586,286 office action dated Feb. 24, 2020.
U.S. Appl. No. 16/752,653 Office Action dated Oct. 1, 2021.
EP Application # 17737420.4 Office Action dated Oct. 28, 2021.
KR Application # 1020200068248 Office Action dated Nov. 12, 2021.
KR Application # 1020207015906 Office Action dated Oct. 13, 2021.
EP Application No. 20177707 Search Report dated Sep. 29, 2020.
Morbi et al., "Short range spectral lidar using mid-infrared semiconductor laser with code-division multiplexing technique", Technical Digest, CLEO 2001, pp. 491-492 pages, May 2001.
Al et al., "High-resolution random-modulation cw lidar", Applied Optics, vol. 50, issue 22, pp. 4478-4488, Jul. 28, 2011.
Chung et al., "Optical orthogonal codes: design, analysis and applications", IEEE Transactions on Information Theory, vol. 35, issue 3, pp. 595-604, May 1989.
Lin et al., "Chaotic lidar", IEEE Journal of Selected Topics in Quantum Electronics, vol. 10, issue 5, pp. 991-997, Sep.-Oct. 2004.
CN Utility Model Patent # 201520865151.7 UMPER report dated Oct. 9, 2019.
International application PCT/US2019/45188 Search report dated Oct. 21, 2019.
Dharbon et al., "SPAD-Based Sensors", TOF Range-Imaging Cameras, Springer-Verlag, pp. 11-38, year 2013.
Niclass et al., "A 0.18 um CMOS SoC for a 100m range, 10 fps 200×96 pixel Time of Flight depth sensor", IEEE International Solid-State Circuits Conference—(ISSCC), Session 27, Image Sensors, 27.6, pp. 488-490, Feb. 20, 2013.
Walker et al., "A 128×96 pixel event-driven phase-domain $\Delta\Sigma$-based fully digital 3D camera in 0.13µm CMOS imaging technology", IEEE International Solid-State Circuits Conference—(ISSCC), Session 23, Image Sensors, 23.6, pp. 410-412, Feb. 23, 2011.
Niclass et al., "Design and characterization of a 256×64-pixel single-photon imager in CMOS fora MEMS-based laser scanning time-of-flight sensor", Optics Express, vol. 20, issue 11, pp. 11863-11881, May 21, 2012.
Kota et al., "System Design and Performance Characterization of a MEMS-Based Laser Scanning Time-of-Flight Sensor Based on a 256×64-pixel Single-Photon Imager", IEEE Photonics Journal, vol. 5, issue 2, pp. 1-15, Apr. 2013.
Webster et al., "A silicon photomultiplier with >30% detection efficiency from 450-750nm and 11.6µm pitch NMOS-only pixel with 21.6% fill factor in 130nm CMOS", Proceedings of the European Solid-State Device Research Conference (ESSDERC), pp. 238-241, Sep. 7-21, 2012.
Roth et al., U.S. Appl. No. 16/532,517, filed Aug. 6, 2019.
Buttgen et al., "Pseudonoise Optical Modulation for Real-Time 3-D Imaging With Minimum Interference", IEEE Transactions on Circuits and Systems I: Regular Papers, vol. 54, Issue10, pp. 2109-2119, Oct. 1, 2007.
Bradski et al., "Learning OpenCV", first edition, pp. 1-50, O'Reilly Media, Inc, California, USA, year 2008.
U.S. Appl. No. 16/885,316 Office Action dated Jun. 30, 2022.
EP Application # 22167103.5 Search Report dated Jul. 11, 2022.
CN Application # 201780058088.4 Office Action dated Aug. 23, 2022.

(56) References Cited

OTHER PUBLICATIONS

U.S. Appl. No. 16/532,513 Office Action dated Aug. 4, 2022.
CN Application # 201810571820.4 Office Action dated Sep. 9, 2022.
KR Application # 1020220101419 Office Action dated Sep. 28, 2022.
U.S. Appl. No. 17/026,365 Office Action dated Nov. 7, 2022.
U.S. Appl. No. 16/532,513 Office Action dated Nov. 23, 2022.

* cited by examiner

FIG. 1

Fig. 5

LIDAR SYSTEM WITH ENHANCED AREA COVERAGE

CROSS-REFERENCE TO RELATED APPLICATION

This application claims the benefit of U.S. Provisional Patent Application 62/875,005, filed Jul. 17, 2019, which is incorporated herein by reference.

FIELD OF THE INVENTION

The present invention relates generally to range sensing, and particularly to devices and methods for depth mapping based on time-of-flight measurement.

BACKGROUND

Time-of-flight (ToF) imaging techniques are used in many depth mapping systems (also referred to as 3D mapping or 3D imaging). In direct ToF techniques, a light source, such as a pulsed laser, directs pulses of optical radiation toward the scene that is to be mapped, and a high-speed detector senses the time of arrival of the radiation reflected from the scene. The depth value at each pixel in the depth map is derived from the difference between the emission time of the outgoing pulse and the arrival time of the reflected radiation from the corresponding point in the scene, which is referred to as the "time of flight" of the optical pulses. The radiation pulses that are reflected back and received by the detector are also referred to as "echoes."

United States Patent Application Publication 2019/0094364, whose disclosure is incorporated herein by reference, describes a depth-sensing apparatus. The apparatus includes a laser, which is configured to emit pulses of optical radiation toward a scene. One or more detectors are configured to receive the optical radiation that is reflected from points in the scene and to output signals indicative of respective times of arrival of the received radiation. Control and processing circuitry is coupled to drive the laser to emit a succession of output sequences of the pulses with different, respective temporal spacings between the pulses within the output sequences in the succession, and to match the times of arrival of input sequences of the signals to the temporal spacings of the output sequences in order to find respective times of flight for the points in the scene.

SUMMARY

Embodiments of the present invention that are described hereinbelow provide improved apparatus and methods for depth mapping.

There is therefore provided, in accordance with an embodiment of the present invention, depth-sensing apparatus, including a laser, which is configured to emit pulses of optical radiation toward a scene. One or more detectors are configured to receive the optical radiation that is reflected from points in the scene and to output signals indicative of respective times of arrival of the received radiation. A scanner is configured to scan the pulses of optical radiation across the scene along successive parallel scan lines of a raster. Control and processing circuitry is coupled to drive the laser to emit a succession of output sequences of the pulses with different, respective temporal spacings between the pulses within the output sequences in the succession, and to match the times of arrival of the signals due to the optical radiation reflected from the points in at least two adjacent scan lines in the raster to the temporal spacings of the output sequences in order to find respective times of flight for the points in the scene.

In some embodiments, the control and processing circuitry is configured to match the times of arrival of the signals to the temporal spacings of the output sequences by calculating a respective fit between the times of arrival of a group of the signals and each of a set of codes conforming to a predefined coding structure, which includes a plurality of the pulses extending across two or more of the adjacent scan lines. In one embodiment, calculating the respective fit includes calculating a residue of each respective fit, and identifying a code that yields a residue that is below a predetermined threshold as the code that matches the group of the signals. The output sequences may be defined so as to maximize the residues of the codes other than the code that matches the group of the signals.

Additionally or alternatively, the control and processing circuitry is configured, in calculating the respective fit, to apply a linear transformation to each code to account for a tilt of the scene, and to calculate the respective fit between the times of arrival of each group of the signals and the pulses in each code following the linear transformation. In one embodiment, the coding structure includes multiple pulses in each of the two adjacent scan lines, and the linear transformation is a two-dimensional transformation.

In some embodiments, the control and processing circuitry is configured first to match the times of arrival of the signals to the output sequences in single scan lines of the raster scan, to identify one or more remaining signals that were not matched to any of the output sequences in a single scan line, and then to match the times of arrival of groups of the signals that include the remaining signals and extend across two or more of the adjacent scan lines in the raster to the temporal spacings of output sequences. In a disclosed embodiment, the control and processing circuitry is configured to match the times of arrival of the groups of the signals that extend across the two or more of the adjacent scan lines only for the groups that include one or more of the remaining signals that were not matched to any of the output sequences in a single scan line.

In a disclosed embodiment, the control and processing circuitry is configured to construct a depth map of the scene based on the times of arrival.

In one embodiment, the control and processing circuitry is configured to match the times of arrival of the signals due to the optical radiation reflected from the points in at least three adjacent scan lines in the raster. Additionally or alternatively, the control and processing circuitry is configured to match the times of arrival of the signals due to the optical radiation reflected from the at least two points in each of two adjacent scan lines.

There is also provided, in accordance with an embodiment of the present invention, a method for depth sensing, which includes directing a succession of output sequences of pulses of optical radiation toward a scene with different, respective temporal spacings between the pulses within the output sequences in the succession, while scanning the pulses across the scene along successive parallel scan lines of a raster. The optical radiation that is reflected from points in the scene is received, and signals are output indicative of respective times of arrival of the received radiation. the times of arrival of the signals due to the optical radiation reflected from the points in at least two adjacent scan lines in the raster are matched to the temporal spacings of the output sequences in order to find respective times of flight for the points in the scene.

The present invention will be more fully understood from the following detailed description of the embodiments thereof, taken together with the drawings in which:

DETAILED DESCRIPTION OF EMBODIMENTS

Overview

As described in United States Patent Application Publication 2019/0094364, referenced above, the spatial resolution of ToF-based LiDARs may be increased by emitting pulse sequences at predetermined but uneven intervals. By choosing the intervals of successive sequences to be sufficiently different, several pulses may be simultaneously "in the air," thus increasing the spatial resolution, while the arrival time of each sequence can still be determined uniquely, enabling an accurate determination of ToF of each pulse. (The procedure of making an unambiguous association between a received pulse sequence or sequence of pulses and a particular emitted pulse or sequence of pulses is termed "disambiguation.")

This method, however, may fail when one or more echoes in a given pulse sequences are not returned from the same planar object. Echoes of this sort can be lost, for example, when the scanned scene comprises an object having a small dimension in the scan direction, or due to variations in the reflectance of an object in the scene. The remaining echoes in such a sequence are referred to herein as "orphaned echoes," i.e., echoes that could not be associated with specific pulses of the original emitted sequence and thus could not be disambiguated by the LiDAR.

Embodiments of the present invention that are described herein provide a LiDAR that is capable of recognizing and disambiguating a single echo or a sequence of echoes with length shorter than the pulse sequence. Specifically, these embodiments use neighboring echoes in successive lines of the scan pattern (meaning that the echoes do not all belong to the same sequence of emitted pulses.) This capability, in turn, enables the LiDAR to add points to the depth map that would otherwise be lost, for example points on objects whose dimensions in the direction of the scan are less than the scan length of a single pulse sequence.

In the disclosed embodiments, a LiDAR depth-sensing apparatus comprises a laser, which emits pulses of optical radiation toward a scene, a scanner, which scans the pulses in parallel scan lines of a raster across the scene, and one or more detectors, which receive the optical radiation that is reflected from points in the scene and output signals indicative of respective times of arrival of these echoes. Control and processing circuitry drives the laser to emit a succession of output sequences of pulses with different, respective temporal spacings between the pulses within the output sequences. The times of arrival of signals due to the optical radiation reflected from the points in at least two adjacent scan lines in the raster are matched by the circuitry to the temporal spacings of the output sequences in order to find respective times of flight for the points in the scene.

In a disclosed embodiment, the laser emits the pulses in output sequences at predetermined but unequal intervals. Moreover, the succession of output sequences within neighboring scan lines differ from each other. (The successions of output sequences may repeat cyclically, for example with a number P of different successions, repeating every P scan lines.) This sort of pulse timing scheme gives rise to a large set of "coding structures," meaning sets of pulses along and across scan lines, with certain timing relations between the pulses in the structure. An "N×M coding structure" comprises M pulses in each of N adjacent scan lines, wherein the N groups (N≥2) of M pulses (M≥1) are projected by the LiDAR at neighboring locations within the same spatial area across the scan lines of the raster scan. The pulses in adjacent scan lines are arranged around repeating average locations across the scan lines, but with a line-to-line and pulse-to-pulse varying dither around the average.

In the embodiments described below, the N×M coding structure is typically of the form 3×1 or 2×2, although other coding structures may also be used. The term "code" refers to a series of numbers denoting the uneven temporal spacings of the M pulses (relative to a reference time) and the relative temporal spacings between the groups of M pulses belonging adjacent scan lines. Thus, the code of a 3×1 coding structure is a 3×1 matrix of numbers, whereas the code of a 2×2 coding structure is a 2×2 matrix of numbers. As the N lines of an N×M are required to have different sequences along each of the lines, P should be at least equal to N.

The pulses that are received by the detectors after reflection from the scene (i.e., the echoes) are grouped by the control and processing circuitry into a group of N×M pulses, termed a "received code," and compared to emitted pulses of the same N×M structure, termed "emitted codes." This comparison of a specific received code to a number of emitted codes is termed "decoding." The emitted code with the best match to the specific received code identifies the emitted code that has been reflected by the scene into that received code. As the time of emission of the emitted code is known by the control and processing circuitry, and as the arrival time of the pulses of the received code on the detector have been measured by the control and processing circuitry, the ToF of the N×M pulses can be unambiguously determined, and the distances from the LiDAR to the points of the scene that reflected the received pulses may be calculated. The echoes are assumed to be reflected from a planar region of the scene, which is a reasonable assumption for a densely-sampled scene.

As will be further detailed below, the control and processing circuitry has the capability to choose different groupings of received pulses as required, i.e., different received codes with different values for N and M for the N×M structure. This capability is used to provide the required additional information for disambiguating orphaned echoes.

In the process of decoding that is described above, a local tilt of a planar region in the scene may be accounted for by stretching (applying a linear transformation to) the intervals between the pulses. This compensates for the difference in ToF between the points on the tilted surface on which the pulses are incident. By minimizing the residue of the fit between the emitted code and the received code, the best fit to a calculated scene tilt is achieved. In practice, the "best match" may be identified as a match for which the residue of the fit is below a predetermined threshold.

In the more general case, decoding extracts coordinates with three degrees of freedom (DoF) from each decoded coding structure: ToF, scene tilt in the direction of the scan, and scene tilt perpendicular to the direction of the scan. For this purpose, each coding structure should comprise at least four pulses, i.e. $N \times M \geq 4$, including at least two pulses both along and across the scan lines, i.e., both $N \geq 2$ and $M \geq 2$. The minimal coding structure satisfying these conditions is $2 \times 2$, whereas a $3 \times 1$ coding structure is able to resolve ToF and scene tilt perpendicular to the direction of the scan. The tilt in the scan direction has a negligible effect on the ToF variation, assuming that the pulses are approximately aligned one under the other, i.e., aligned in a direction perpendicular to the direction of the scan.

Although coding structures have been above described as rectangular structures, other shapes of coding structures, for example an L-shape, may be used.

In some embodiments, decoding of codes that extended over multiple scan lines is performed only as a second stage of a decoding process, for disambiguation of only orphaned echoes that remain after decoding pulsed sequences along the scan lines. This approach considerably reduces the memory and time resources demanded by the process. In the first stage of this embodiment, the control and processing circuitry decodes and disambiguates the received pulse sequences only along scan lines, in a similar way to that described in the above-referenced United States Patent Application Publication 2019/0094364. The disambiguated echoes from this first stage are utilized to establish a depth map of the target scene that includes the uniquely determined point distances.

The first stage may leave orphaned echoes, i.e., single echoes or sequences of echoes shorter than the length of the pulse sequence in the scan direction, which therefore could not be disambiguated in the first stage. The orphaned echoes are stored together with a sufficient number of neighboring received pulses both along the scan lines and across the scan lines in order to provide for the code structures that will be used in the second stage for disambiguating the orphaned echoes. This approach is advantageous in reducing the complexity (and thus the required computational resources) of the process due to the following:

1. Orphaned echoes are fitted only in the areas of the missing points of the point map, i.e., to the received pulses that were not matched to emitted pulses.
2. A code structure can comprise orphaned echoes together with decoded echoes. This feature reduces the number of possible codes. For example, using a $3 \times 1$ code structure in the presence of K orphaned echoes possible for each point, $K^3$ combinations are required. However, if one of the points is an echo that was already decoded in the first stage, the number of required combinations is reduced to $K^2$.

After a successful fit of the decoded orphaned echoes, they are added to the point map and eliminated from further stages of decoding.

Optimization schemes for choosing the codes of both $3 \times 1$ and $2 \times 2$ code structures are detailed hereinbelow. The optimized codes are utilized for assuring a low probability for ambiguity in the decoding process.

In a further embodiment, the detectors also measure the intensities of the received pulses, in addition to the time of arrival of each pulse. The intensity of the received pulses can then be used as an additional dimension of the decoding process to increase the robustness of the disambiguation.

System Description

Figure 1:
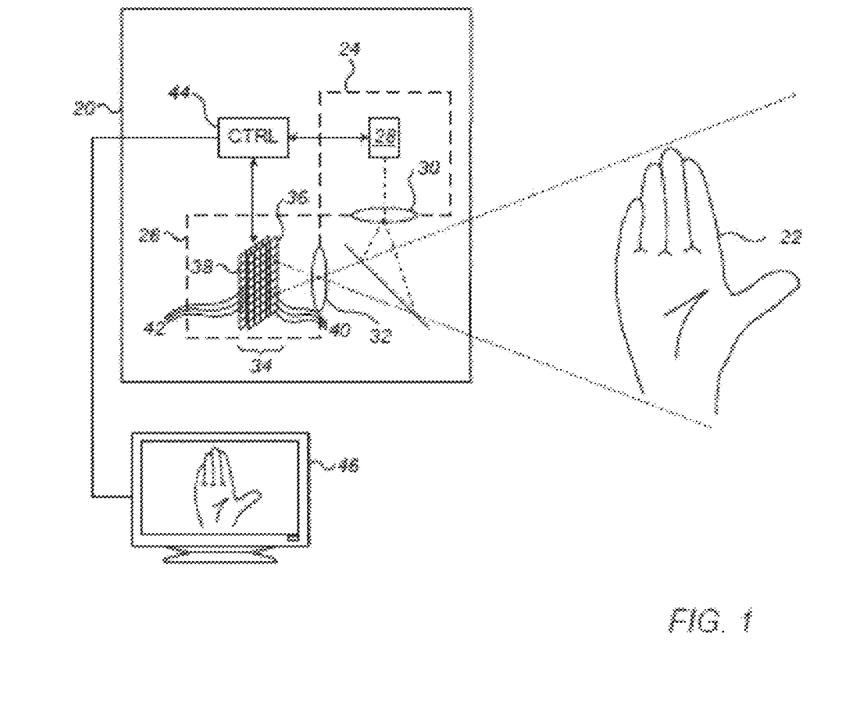
FIG. 1 is a schematic side view of a depth-sensing apparatus, in accordance with an embodiment of the invention.

FIG. 1 is a schematic side view of a depth-sensing apparatus 20, in accordance with an embodiment of the invention. In the pictured embodiment, apparatus 20 is used to generate depth maps of a scene including an object 22, in this example a hand of a user of the apparatus. To generate the depth map, an illumination assembly 24 directs pulses of light toward object 22, and an imaging assembly 26 measures the ToF of the photons reflected from the object. (The term "light," as used in the present description and in the claims, refers to optical radiation, which may be in any of the visible, infrared, and ultraviolet ranges.)

Illumination assembly 24 typically comprises a pulsed laser 28, which emits short pulses of light, with pulse duration in the nanosecond range and repetition frequency in the range of 0.5-50 MHz, for example. Projection optics 30 direct the light toward object 22. Alternatively, other pulse durations and repetition frequencies may be used, depending on application requirements. In some embodiments, illumination assembly 24 comprises a scanner, such as one or more rotating mirrors (not shown), which scans the beam of pulsed light across the scene forming lines of a raster scan. In other embodiments, illumination assembly comprises an array of lasers, in place of laser 28, which illuminates different parts of the scene either concurrently or sequentially along the lines of a raster. More generally, illumination assembly 24 may comprise substantially any pulsed laser or laser array that can be driven to emit sequences of pulses toward object 22 at irregular intervals.

Imaging assembly 26 comprises objective optics 32, which image object 22 onto one or more detectors, represented in the figure by a sensing array 34, so that photons emitted by illumination assembly 24 and reflected from object 22 are incident on the sensing device. In the pictured embodiment, sensing array 34 comprises a sensor chip 36 and a processing chip 38, which are coupled together, for example, using chip stacking techniques that are known in the art. Sensor chip 36 comprises one or more high-speed photodetectors, such as avalanche photodiodes.

In some embodiments, sensor chip 36 comprises a single photodetector, such as a single avalanche photodiode or SPAD. In other embodiments, the photodetectors in sensor chip 36 comprise an array of SPADs 40, each of which outputs a signal indicative of the times of arrival of photons on the SPAD following emission of pulses by illumination assembly 24. Processing chip 38 comprises an array of processing circuits 42, which are coupled respectively to the sensing elements. Both of chips 36 and 38 may be produced from silicon wafers using well-known CMOS fabrication processes, based on SPAD sensor designs that are known in the art, along with accompanying drive circuits, logic and memory. For example, chips 36 and 38 may comprise circuits as described in U.S. Patent Application Publication 2017/0052065 and/or U.S. Patent Application Publication 2017/0179173, both of whose disclosures are incorporated herein by reference. Alternatively, the designs and principles of detection that are described herein may be implemented, mutatis mutandis, using other circuits, materials and processes. All such alternative implementations are considered to be within the scope of the present invention.

Imaging assembly 26 outputs signals that are indicative of respective times of arrival of the received radiation at each SPAD 40 or, equivalently, from each point in the scene that is being mapped. These output signals are typically in the form of respective digital values of the times of arrival that are generated by processing circuits 42, although other signal formats, both digital and analog, are also possible. Control and processing circuitry 44 reads out the individual pixel values and generates an output depth map, comprising the measured ToF—or equivalently, the measured depth value—at each pixel. The depth map is typically conveyed to a receiving device 46, such as a display or a computer or other processor, which segments and extracts high-level information from the depth map.

In other embodiments, imaging assembly 26 outputs signals that are indicative of respective times of arrival and pulse energies of the received radiation at each SPAD 40 or, equivalently, from each point in the scene that is being mapped.

As explained above, control and processing circuitry 44 drives the laser or lasers in illumination assembly 24 to emit sequences of pulses in a predefined temporal pattern, with irregular intervals between the pulses in the sequence. Control and processing circuitry 44 then finds the respective times of flight for the points in the scene by matching the times of arrival of input sequences of the signals to the temporal spacings of the output sequences both within each scan line and between neighboring scan lines.

The matching is challenged by orphaned echoes, as outlined above. An example of possible orphaned echoes is provided by object 22, which in FIG. 1 is depicted as a hand: Were the fingers of the hand to be spread out, and were a scan line to cross the spread-out fingers, the spaces between the fingers would not return an echo for pulses "shot" between the fingers. The echoes received from the neighboring points along the scan lines might then become orphaned echoes. The process of matching, including the disambiguation of orphaned echoes, will be further detailed in the sections below.

Although the present description relates to control and processing circuitry 44 and processing chip 38 as separate entities, with a certain division of functions between the control and processing circuitry and processing chip, in practice these entities and their functions may be combined and implemented monolithically on the same integrated circuit. Alternatively, other divisions of functionality between these entities will also be apparent to those skilled in the art and are considered to be within the scope of the present invention. Therefore, in the present description and in the claims, control and processing circuitry 44 and processing chip 38 are referred to collectively as "control and processing circuitry 44," and this term is meant to encompass all implementations of the functionalities that are attributed to these entities.

Coding Structures

Figure 2:
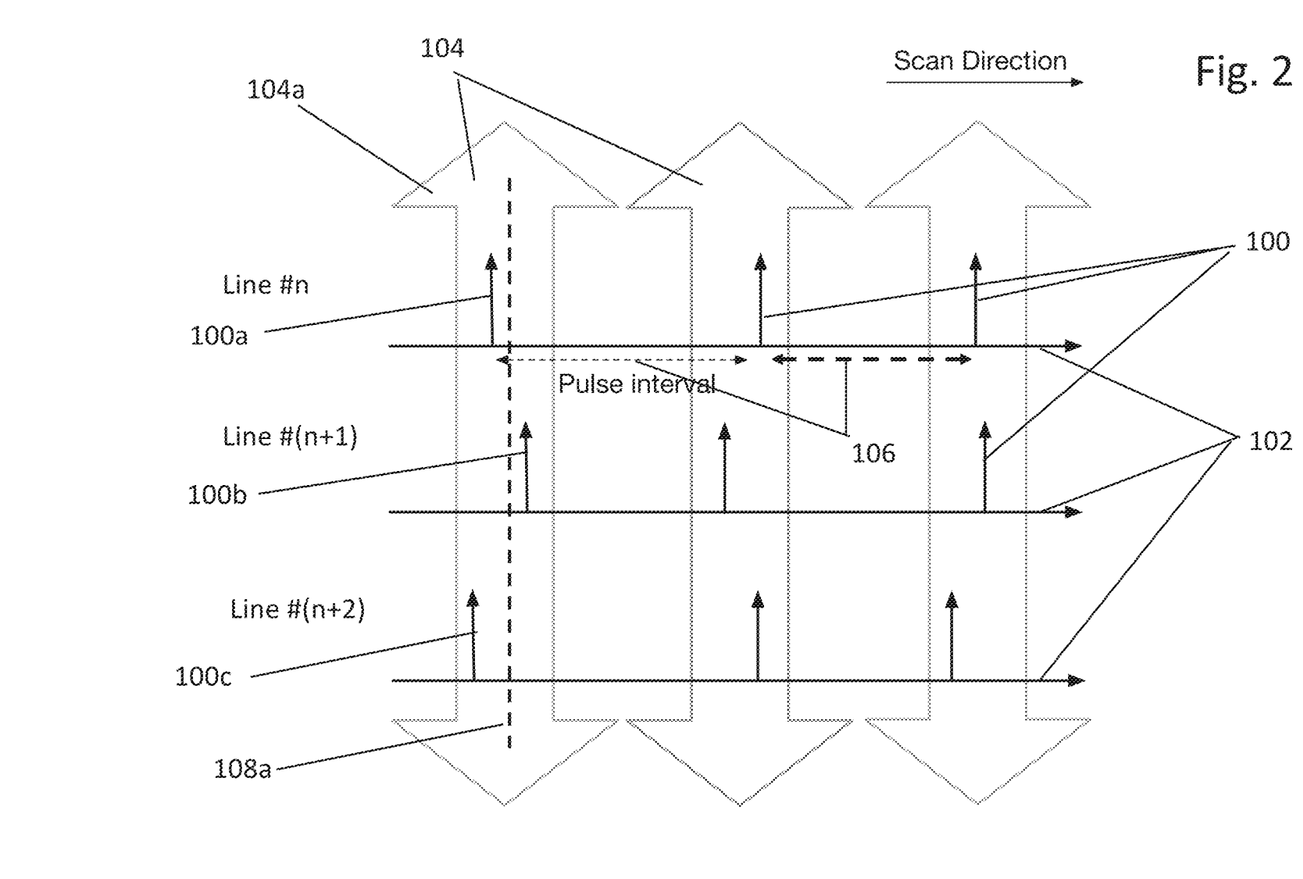
FIG. 2 is a schematic representation of a group of 3×1 coding structures, in accordance with an embodiment of the invention.

FIG. 2 is a schematic representation of a group of 3×1 coding structures, in accordance with an embodiment of the invention.

Laser 28 emits pulses 100, shown schematically as upright arrows, in a succession of temporal sequences. Pulses 100 are scanned along raster lines 102, with the scan direction of the raster lines in this example being from left to right. As described above with reference to FIG. 1, raster lines 102 are produced by, for example, a scanner or by an array of lasers. Only three raster lines 102, numbered as n, n+1, and n+2, are shown in FIG. 2, wherein n is a positive integer. Similarly, only three pulses 100 are shown for each raster line 102. In general, an emission sequence of a given scan line comprises L pulse-to-pulse intervals repeated cyclically. L is chosen as the number of pulses that may be in the air simultaneously at any given time during a scan, and may be for example 3 for a short distance between depth-sensing apparatus 20 and the scene, or 5, 10, 20, or even higher for a long distance (The maximal number of "pulses in the air" may be limited by the optical design of the sensor.) In most embodiments, a large number of emission sequences and raster lines 102 are generated, with typical numbers of sequences per raster line and numbers of raster lines being in the tens or hundreds.

Double-arrows 104 are used to mark coding structures, with each double-arrow encompassing a 3×1 coding structure comprising three pulses 100, one from each of scan lines n, n+1, and n+2. With reference to the notation presented above in the Overview, the parameters defining the coding structure are N=3 and M=1; and the code of each of the coding structures refers to the specific temporal locations of the pulses within each structure, with details given further below. The pulse-to-pulse intervals within raster line 102, shown by dotted arrows 106, vary between adjacent pairs of pulses 100. As an example, the code encompassed by a double-arrow 104a comprises pulses 100a, 100b, and 100c, which are in dithered positions around an average position 108a. The dithered positions of the three pulses within each of the 3×1 codes vary from code to code.

Figure 3:
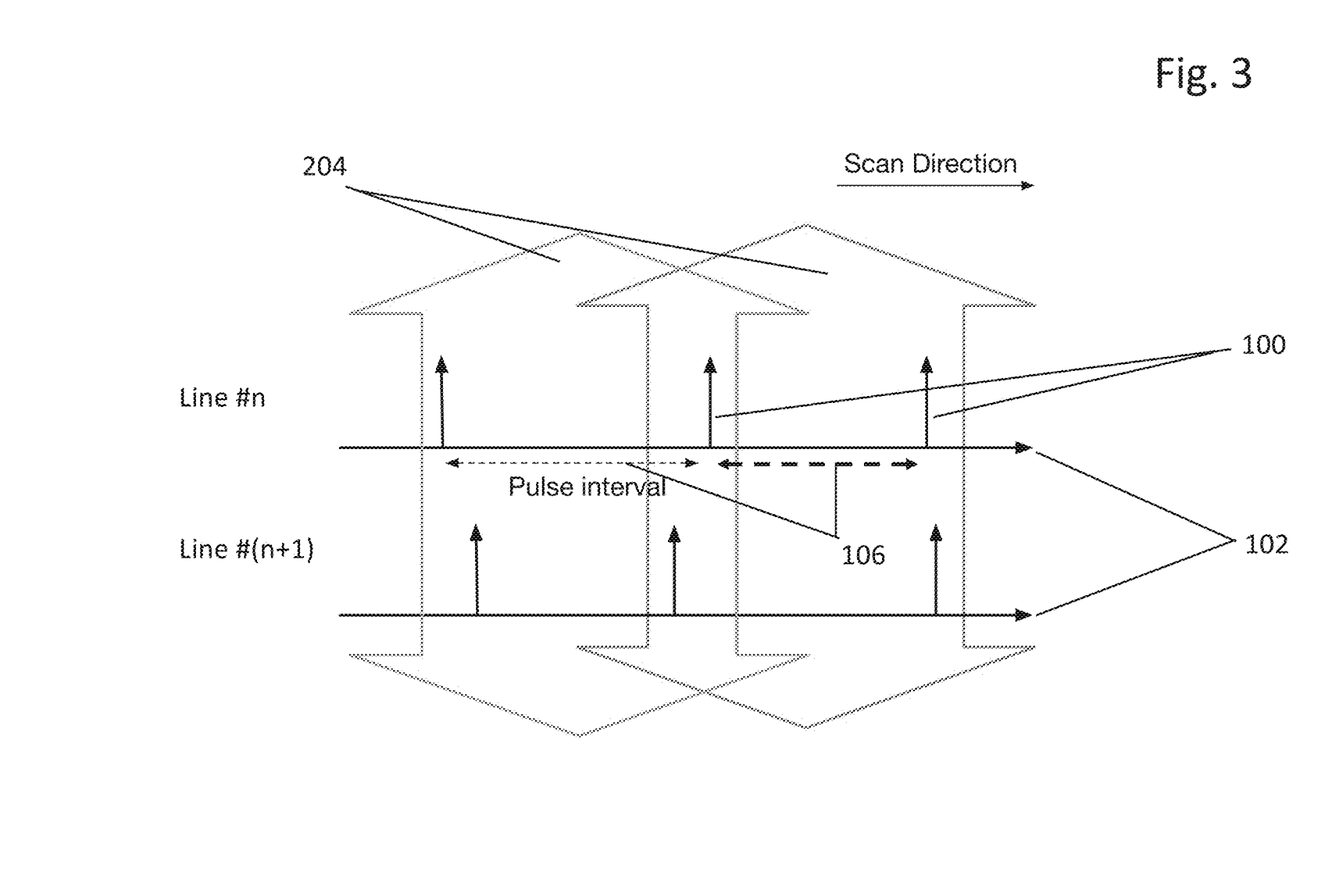
FIG. 3 is a schematic representation of a pair of 2×2 coding structures, in accordance with another embodiment of the invention.

FIG. 3 is a schematic representation of a pair of 2×2 coding structures, in accordance with another embodiment of the invention.

Using the same notation as in FIG. 2, pulses 100 emitted by laser 28, with pulse-to-pulse intervals 106 and scanned from left to right along scan lines 102, are now viewed as 2×2 coding structures, as shown by double-arrows 204. Each coding structure comprises two pulses within each of the two scan lines n and n+1.

Figure 4:
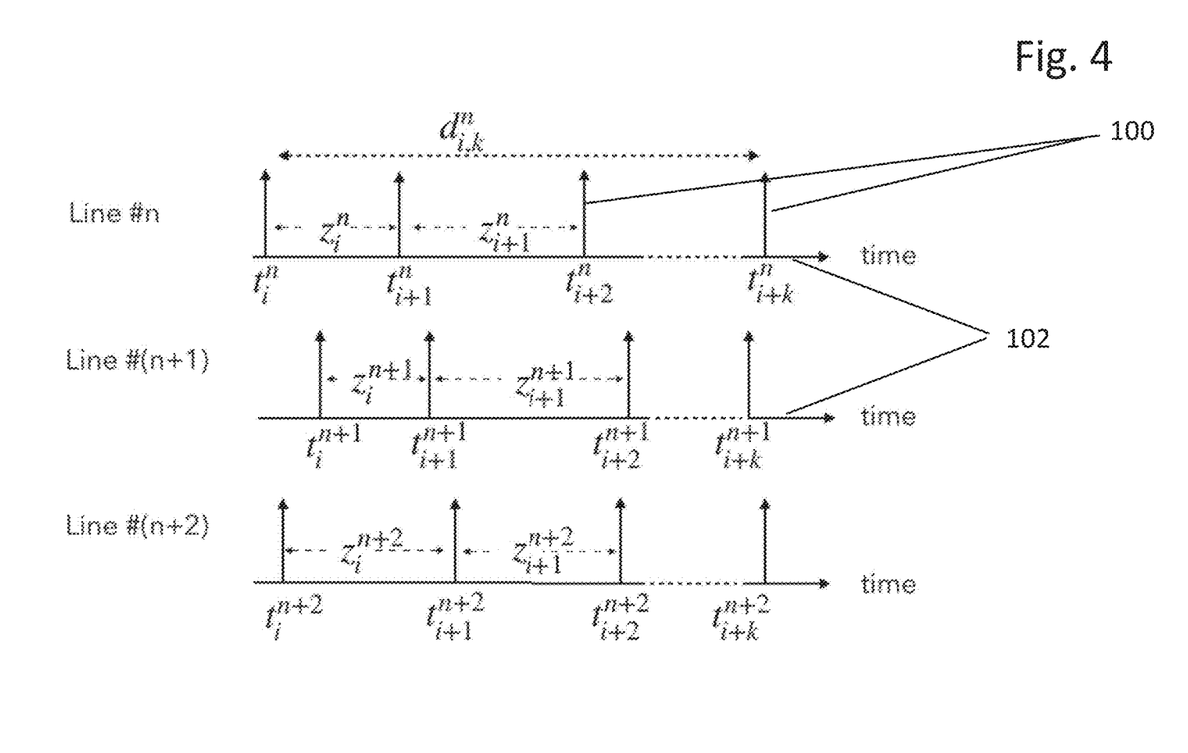
FIG. 4 is a schematic representation of sequences of pulses emitted along a success of scan lines, in accordance with an embodiment of the present invention.

FIG. 4 is a schematic representation of sequences of pulses 100 emitted along a success of scan lines 102, illustrating the notation used for the optimization of codes and fitting of residues in the description that follows. The emission time (the time when the pulse was emitted by laser 28) of the $i^{th}$ pulse of the $n^{th}$ line is denoted by $t_i^n$. The interval between pulses i and i+1 for line n is given by $z_i^n = t_{i+1}^n - t_i^n$. The temporal difference between non-consecutive emissions that are k pulses apart is given by $$d_{i,k}^n = \sum_{j=i}^{i+k-1} z_j^n.$$

The temporal sequences for adjacent scan lines are different from each other; however, the sequences may repeat cyclically every P scan lines.

Figure 5:
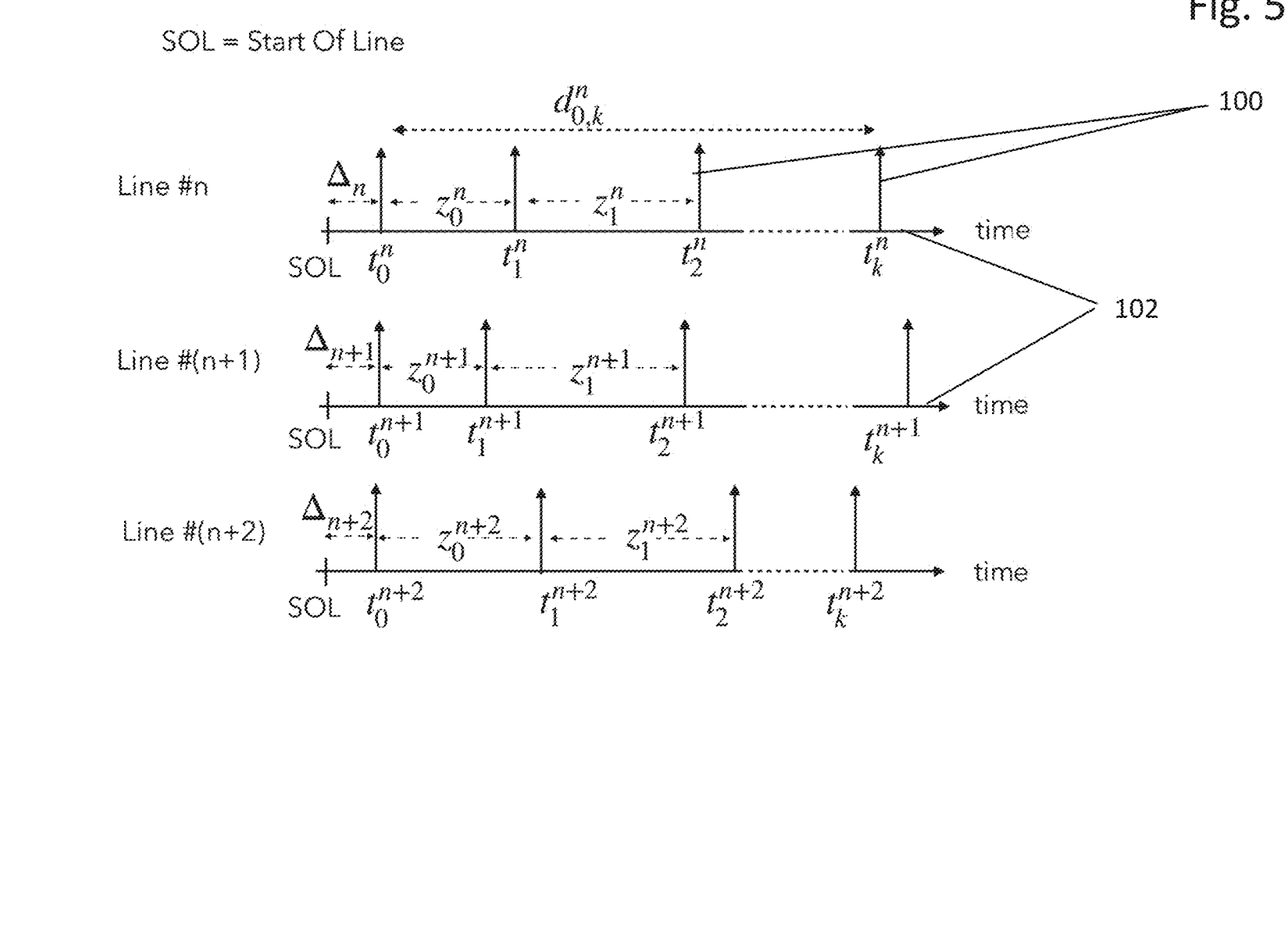
FIG. 5 is a schematic representation of pulses illustrating a mutual temporal alignment of scan lines, in accordance with an embodiment of the invention.

FIG. 5 is a schematic representation of pulses 100 illustrating the mutual temporal alignment of scan lines 102, in accordance with an embodiment of the invention. All scan lines 102 start at a respective point in time that is denoted by SOL (Start Of Line). The SOL times for successive scan lines 102 may be simultaneous, or they may be spaced apart by a predefined, fixed interval. The emission time of the first pulse in line n, $t_0^n$, is offset from SOL by $\Delta_n$, wherein the offsets between for all scan lines are chosen so that $$|t_i^n - t_i^{n+1}| < t_{th}$$

for every pulse i for every line n, and wherein $t_{th}$ is a predetermined threshold. Threshold $t_{th}$ assures that the $i^{th}$ pulses of the adjacent scan lines are approximately aligned one under the other. Any misalignment will create a residue in the fitting process, which will add an additional requirement to the separation of the codes. In FIG. 5, all offsets $\Delta_n$, $\Delta_{n+1}$, and $\Delta_{n+2}$ have been chosen, for the sake of simplicity, to be equal, although non-equal values of $\Delta$ may alternatively be used.

For a 3×1 coding structure, as shown in FIG. 2, a code can be represented as a vector $(d_{0,l}^n, d_{0,l}^{n+1}, d_{0,l}^{n+2})$, wherein l=1 . . . L. In order to ensure a high degree of disambiguation, the codes along any three neighboring scan lines can be optimized by choosing the temporal differences $d_{i,k}^n$ so as to maximize the minimal value of the following expression for i=1 . . . L, $\{\forall j=0 \ldots 2: 0 \leq k_j \leq L-1\}$:

$$\sum_{j=0}^{2} k_j > 0, n =$$

$$0 \ldots P-1: \left\| \begin{bmatrix} d_{i,k_0}^n \\ d_{i,k_1}^{(n+1) \bmod P} \\ d_{i,k_2}^{(n+2) \bmod P} \end{bmatrix} - \begin{bmatrix} 5/6 & 1/3 & -1/6 \\ 1/3 & 1/3 & 1/3 \\ -1/6 & 1/3 & 5/6 \end{bmatrix} \begin{bmatrix} d_{i,k_0}^n \\ d_{i,k_1}^{(n+1) \bmod P} \\ d_{i,k_2}^{(n+2) \bmod P} \end{bmatrix} \right\|_2$$

For a 2×2 coding structure, as shown in FIG. 3, a code can be represented as a vector $(d_{0,l}^n, d_{0,l+1}^n, d_{0,l}^{n+1}, d_{0,l+1}^{n+1})$, wherein l=1 . . . L. In order to ensure a high degree of disambiguation, the codes along any two neighboring scan lines can be optimized by choosing the temporal differences $d_{i,k}^n$ so as to maximize the minimal value of the following expression for i=1 . . . L, $\{\forall j=0 \ldots 3: 0 \leq k_j \leq L-1)\}$:

$$\sum_{j=0}^{3} k_j > 0, n =$$

$$0 \ldots P-1: \left\| \begin{bmatrix} d_{i,k_0}^n \\ d_{i+1,k_1}^n \\ d_{i,k_2}^{(n+1) \bmod P} \\ d_{i+1,k_3}^{(n+1) \bmod P} \end{bmatrix} - \begin{bmatrix} 1 & -1/2 & -z_i^n/2 \\ 1 & -1/2 & z_i^n/2 \\ 1 & 1/2 & -z_i^{n+1}/2 \\ 1 & 1/2 & z_i^{n+1}/2 \end{bmatrix}^{OP} \begin{bmatrix} d_{i,k_0}^n \\ d_{i+1,k_1}^n \\ d_{i,k_2}^{(n+1) \bmod P} \\ d_{i+1,k_3}^{(n+1) \bmod P} \end{bmatrix} \right\|_2$$

The superscript "OP" on a matrix, in the form $A^{OP}$, denotes a projection matrix on the subspace formed by the columns of A.

The optimization process may be simplified by using the same temporal sequence for all scan lines, and by having the starting interval index in the sequence increase by S steps for consecutive scan lines. In this case, the codes along three neighboring scan lines can be optimized by choosing the temporal differences $d_{i,k}^n$ so as to maximize the minimal value of the following expression for i=1 . . . L, $\{\forall j=0 \ldots 2: 0 \leq k_j \leq L-1\}$:

$$\sum_{j=0}^{2} k_j > 0: \left\| \begin{bmatrix} d_{i,k_0} \\ d_{i+S,k_1} \\ d_{i+2S,k_2} \end{bmatrix} - \begin{bmatrix} 5/6 & 1/3 & -1/6 \\ 1/3 & 1/3 & 1/3 \\ -1/6 & 1/3 & 5/6 \end{bmatrix} \begin{bmatrix} d_{i,k_0} \\ d_{i+S,k_1} \\ d_{i+2S,k_2} \end{bmatrix} \right\|_2$$

Similarly, the codes in a 2×2 coding structure can be optimized by maximizing the minimal value of the following expression for i=1 . . . L, $\{\forall j=0 \ldots 3: 0 \leq k_j \leq L-1\}$:

$$\sum_{j=0}^{3} k_j > 0: \left\| \begin{bmatrix} d_{i,k_0} \\ d_{i+1,k_1} \\ d_{i+S,k_2} \\ d_{i+S+1,k_3} \end{bmatrix} - \begin{bmatrix} 1 & -1/2 & -z_i/2 \\ 1 & -1/2 & z_i/2 \\ 1 & 1/2 & -z_{i+S}/2 \\ 1 & 1/2 & z_{i+S}/2 \end{bmatrix}^{OP} \begin{bmatrix} d_{i,k_0} \\ d_{i+1,k_1} \\ d_{i+S,k_2} \\ d_{i+S+1,k_3} \end{bmatrix} \right\|_2$$

Fitting N×M Echoes to a Code

In order to disambiguate the received pulses, control and processing circuitry 44 will try to fit a given set of N×M echoes together to all possible codes. A code is considered "possible" when the emission times of all the pulses in the code could give rise to reflections with arrival times corresponding to the received echoes considering the maximal time of flight to be detected by apparatus 20. In order to account for possible tilt of the surface in the scene from which the pulses are reflected, the fit process includes a linear transformation of the calculated ToF values within a given code, wherein the scene tilt is used as a free parameter in calculating the residue from the fit. For an optimized emission sequence, fitting of codes other than the correct one will result in high residues, and these codes will accordingly be discarded.

For a 3×1 coding structure the residue of the fit for any given possible code is given by the following expression:

$$\left\| \begin{bmatrix} tof_0 \\ tof_1 \\ tof_2 \end{bmatrix} - \begin{bmatrix} 1 & 1 \\ 1 & 0 \\ 1 & -1 \end{bmatrix} \begin{bmatrix} \hat{\tau} \\ \hat{\alpha} \end{bmatrix} \right\|_2,$$

wherein:
to $f_j$ is the difference between the emission time and arrival time of each pulse j for the possible code under consideration;
$\hat{\tau}$ is the average measured time of flight of the three pulses; and
$\hat{\alpha} = tof_2 - tof_0$ depends on the object inclination and is limited by a predefined maximal inclination.

For a 2×2 coding structure the residue of the fit is given by the following expression:

$$\left\| \begin{bmatrix} tof_0 \\ tof_1 \\ tof_2 \\ tof_3 \end{bmatrix} - \begin{bmatrix} 1 & -1/2 & -z_0/2 \\ 1 & -1/2 & z_0/2 \\ 1 & 1/2 & -z_1/2 \\ 1 & 1/2 & z_1/2 \end{bmatrix} \begin{bmatrix} \hat{\tau} \\ \hat{\alpha} \\ \hat{\beta} \end{bmatrix} \right\|_2,$$

wherein:
$tof_0, tof_1$ are the differences between the emission time and arrival time of a pair of pulses in the first scan line for the possible code under consideration, and $tof_3, tof_4$ are the corresponding differences in the second scan line;
$z_0$ and $z_1$ are the intervals between the successive emitted pulses in the two scan lines of the possible code under consideration;

$\hat{\alpha} = (tof_0 + tof_1) - (tof_2 + tof_3)$; and $$\hat{\beta} = \frac{-z_0 tof_0 + z_0 tof_1 - z_1 tof_2 + z_1 tof_3}{z_0^2 + z_1^2}.$$

Both $\hat{\alpha}$ and $\hat{\beta}$ depend on the object inclination (perpendicular to and along the scan direction) and are limited by a predefined maximal inclination.

Staged Disambiguation

Figure 6:
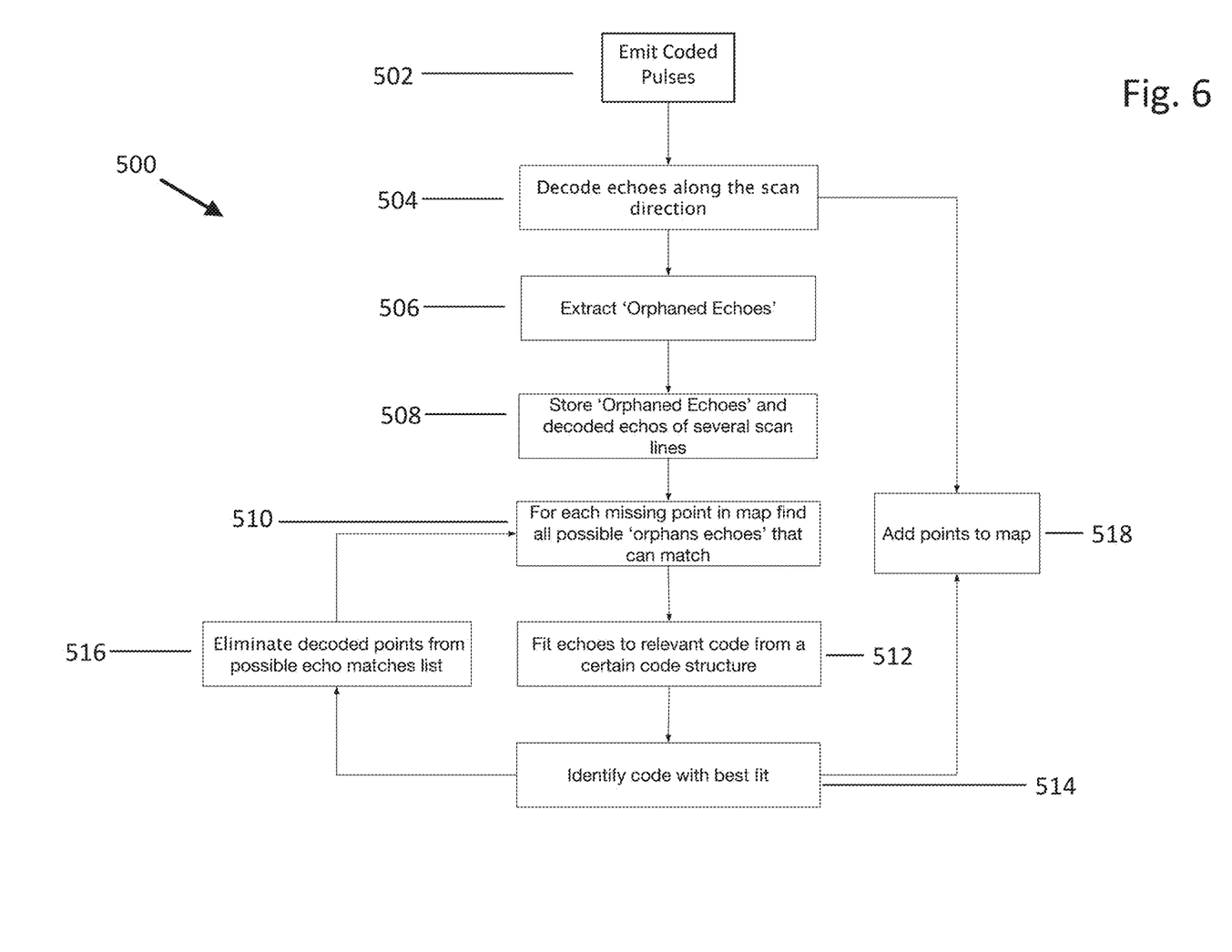
FIG. 6 is a flowchart that schematically illustrates a two-stage disambiguation process, in accordance with an embodiment of the invention.

FIG. 6 is a flowchart that schematically illustrates a two-stage disambiguation process, in accordance with an embodiment of the invention. Although the embodiments described above may be used as a stand-alone pulse sequence design and decoding method, in the present embodiment, illustrated in a flowchart 500, disambiguation is performed in two stages.

In an emission step 502, laser 28 emits coded sequences of pulses (emitted codes) toward a scene. In a first decoding step 504, control and processing circuitry 44 decodes and disambiguates the sequences of echo pulses received from the scene along each scan line separately. The computed times of flight and/or depth values of successfully decoded points are stored in a point map in a point addition step 518. Under normal operating conditions, this step is expected to provide depth values for most of the points in the scene.

In an orphan extraction step 506, control and processing circuitry 44 identifies the sequences of orphaned echoes, i.e., echoes that could not be associated with specific pulses of the emitted sequence and therefore could not be disambiguated in the first stage. In a storage step 508, these orphaned echoes are stored in a memory, together with a sufficient number of other echoes (generally multiple echoes on multiple lines around the orphaned echoes) to fill in code structures that can be used in the second stage for disambiguating the orphaned echoes.

In a missing point step 510, control and processing circuitry 44 identifies all orphaned echoes that can match a given point that is missing from the point map. In a second decoding step 512, each orphaned echo identified in missing point step 510 is joined with relevant surrounding echoes into a coding structure (for example, a 3×1 or a 2×2 coding structure, or any other suitable coding structure), and fit to possible corresponding codes. In a best fit step 514, control and processing circuitry 44 identifies the coding structure and code that yield the best fit for a given orphaned echo are identified. The computed times of flight and/or depth values of the points decoded at step 514 are stored in point addition step 518.

The decoded points are removed from the list of stored orphaned echoes in an elimination step 516. This process continues until all orphaned echoes have been decoded or until control and processing circuitry 44 determines that no further decoding is possible. When an echo is matched to two different ToF's by decoding of different codes, this occurrence may be used for signaling anomalies in the mapping process and to reduce the rate of false alarms.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Depth-sensing apparatus, comprising:
   a laser, which is configured to emit pulses of optical radiation toward a scene;
   one or more detectors, which are configured to receive the optical radiation that is reflected from points in the scene and to output signals indicative of respective times of arrival of the received radiation;
   a scanner configured to scan the pulses of optical radiation across the scene in a given scan direction along successive parallel scan lines of a raster; and
   control and processing circuitry, which is coupled
      (i) to drive the laser to emit a succession of output sequences of the pulses at known times of emission with different, respective temporal spacings between the pulses within the output sequences in the succession, and
      (ii) to match
         (a) the times of arrival indicated by the signals output by the one or more detectors due to the optical radiation reflected from the points in at least two adjacent scan lines in the raster to
         (b) the known times of emission and the temporal spacings of the output sequences in order to find respective times of flight for the points in the scene from which the optical radiation is reflected.

2. The depth-sensing apparatus according to claim 1, wherein the control and processing circuitry is configured to match the times of arrival of the signals to the temporal spacings of the output sequences by calculating a respective fit between the times of arrival of a group of the signals and each of a set of codes conforming to a predefined coding structure, which comprises a plurality of the pulses extending across two or more of the adjacent scan lines.

3. The depth-sensing apparatus according to claim 2, wherein calculating the respective fit comprises calculating a residue of each respective fit, and identifying a code that yields a residue that is below a predetermined threshold as the code that matches the group of the signals.

4. The depth-sensing apparatus according to claim 3, wherein the output sequences are defined so as to maximize the residues of the codes other than the code that matches the group of the signals.

5. The depth-sensing apparatus according to claim 2, wherein the control and processing circuitry is configured, in calculating the respective fit, to apply a linear transformation to each code to account for a tilt of the scene, and to calculate the respective fit between the times of arrival of each group of the signals and the pulses in each code following the linear transformation.

6. The depth-sensing apparatus according to claim 5, wherein the coding structure includes multiple pulses in each of the two adjacent scan lines, and wherein the linear transformation is a two-dimensional transformation.

7. The depth-sensing apparatus according to claim 1, wherein the control and processing circuitry is configured first to match the times of arrival of the signals to the output sequences in single scan lines of the raster scan, to identify one or more remaining signals that were not matched to any of the output sequences in a single scan line, and then to match the times of arrival of groups of the signals that include the remaining signals and extend across two or more of the adjacent scan lines in the raster to the temporal spacings of output sequences.

8. The depth-sensing apparatus according to claim 7, wherein the control and processing circuitry is configured to match the times of arrival of the groups of the signals that extend across the two or more of the adjacent scan lines only for the groups that include one or more of the remaining signals that were not matched to any of the output sequences in a single scan line.

9. The depth-sensing apparatus according to claim 1, wherein the control and processing circuitry is configured to construct a depth map of the scene based on the times of arrival.

10. The depth-sensing apparatus according to claim 1, wherein the control and processing circuitry is configured to match the times of arrival of the signals due to the optical radiation reflected from the points in at least three adjacent scan lines in the raster.

11. The depth-sensing apparatus according to claim 1, wherein the control and processing circuitry is configured to match the times of arrival of the signals due to the optical radiation reflected from the at least two points in each of two adjacent scan lines.

12. A method for depth sensing, comprising:
    directing a succession of output sequences of pulses of optical radiation toward a scene at known times of emission with different, respective temporal spacings between the pulses within the output sequences in the succession, while scanning the pulses across the scene in a given scan direction along successive parallel scan lines of a raster;
    receiving the optical radiation that is reflected from points in the scene and outputting signals indicative of respective times of arrival of the received radiation; and
    matching (a) the times of arrival indicated by the signals due to the optical radiation reflected from the points in at least two adjacent scan lines in the raster to (b) the known times of emission and the temporal spacings of the output sequences in order to find respective times of flight for the points in the scene from which the optical radiation is reflected.

13. The method according to claim 12, wherein matching the times of arrival of the signals to the temporal spacings of the output sequences comprises calculating a respective fit between the times of arrival of a group of the signals and each of a set of codes conforming to a predefined coding structure, which comprises a plurality of the pulses extending across two or more of the adjacent scan lines.

14. The method according to claim 13, wherein calculating the respective fit comprises calculating a residue of each respective fit, and identifying a code that yields a residue that is below a predetermined threshold as the code that matches the group of the signals.

15. The method according to claim 14, and comprising defining the output sequences so as to maximize the residues of the codes other than the code that matches the group of the signals.

16. The method according to claim 13, wherein calculating the respective fit comprises applying a linear transformation to each code to account for a tilt of the scene, and calculating the respective fit between the times of arrival of each group of the signals and the pulses in each code following the linear transformation.

17. The method according to claim 12, wherein matching the times of arrival comprises first matching the times of arrival of the signals to the output sequences in single scan lines of the raster scan, identifying one or more remaining signals that were not matched to any of the output sequences in a single scan line, and then matching the times of arrival of groups of the signals that include the remaining signals and extend across two or more of the adjacent scan lines in the raster to the temporal spacings of output sequences.

18. The method according to claim 12, and comprising constructing a depth map of the scene based on the times of arrival.

19. The method according to claim 12, wherein matching the times of arrival comprises matching the times of arrival of the signals due to the optical radiation reflected from the points in at least three adjacent scan lines in the raster.

20. The method according to claim 12, wherein matching the times of arrival comprises matching the times of arrival of the signals due to the optical radiation reflected from the at least two points in each of two adjacent scan lines.

* * * * *